United States Patent
Ide et al.

(10) Patent No.: US 9,618,766 B2
(45) Date of Patent: Apr. 11, 2017

(54) OPTICAL DEVICE AND DISPLAY APPARATUS

(71) Applicant: Seiko Epson Corporation, Tokyo (JP)

(72) Inventors: Mitsutaka Ide, Shiojiri (JP); Masatoshi Yonekubo, Hara-mura (JP); Kunihiko Yano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/926,917

(22) Filed: Oct. 29, 2015

(65) Prior Publication Data

US 2016/0124226 A1 May 5, 2016

(30) Foreign Application Priority Data

Nov. 5, 2014 (JP) .................. 2014-224974

(51) Int. Cl.
| | |
|---|---|
| *G02B 27/01* | (2006.01) |
| *G02B 27/28* | (2006.01) |
| *G02B 27/09* | (2006.01) |
| *G02B 27/14* | (2006.01) |
| *G02B 5/30* | (2006.01) |
| *G02B 27/00* | (2006.01) |
| *G02B 27/10* | (2006.01) |

(52) U.S. Cl.
CPC ....... *G02B 27/283* (2013.01); *G02B 27/0081* (2013.01); *G02B 27/0172* (2013.01);
(Continued)

(58) Field of Classification Search
CPC .. G02B 5/3041; G02B 5/3066; G02B 5/3083; G02B 27/0101; G02B 27/0103;
(Continued)

(56) References Cited

U.S. PATENT DOCUMENTS 5,975,703 A * 11/1999 Holman ............. G03B 21/2073
349/9
6,445,362 B1 * 9/2002 Tegreene ............ G02B 26/0841
345/4

(Continued)

FOREIGN PATENT DOCUMENTS

| JP | 2006-119533 A | 5/2006 |
| JP | 2006-301234 A | 11/2006 |
| WO | WO-2005-088384 A | 9/2005 |

*Primary Examiner* — Frank Font
(74) *Attorney, Agent, or Firm* — ALG Intellectual Property, LLC

(57) ABSTRACT

An optical device which is disposed between a light source section of a display apparatus and a projection target member, includes a first luminous flux diameter enlargement element in which a first light-transmissive layer and a first partially reflective layer are alternately laminated in a first direction, and a second luminous flux diameter enlargement element in which a second light-transmissive layer and a second partially reflective layer are alternately laminated in a second direction intersecting the first direction. The first partially reflective layer and the second partially reflective layer are formed from dielectric multilayered films that have the same film configuration. In addition, the optical device includes a retardation element that is formed from a ½λ retardation plate between a first emission surface of the first luminous flux diameter enlargement element and a second incidence surface of the second luminous flux diameter enlargement element.

12 Claims, 6 Drawing Sheets

(52) U.S. Cl.
CPC ..... *G02B 27/0905* (2013.01); *G02B 27/1066* (2013.01); *G02B 27/142* (2013.01); *G02B 27/145* (2013.01); *G02B 2027/0125* (2013.01)

(58) Field of Classification Search
CPC  G02B 27/0905; G02B 27/142; G02B 27/145; G02B 27/283; G02F 1/13363
USPC ............ 359/485.03, 485.06, 485.07, 489.07, 359/489.09, 489.11, 630, 633, 638; 349/96, 117
See application file for complete search history.

(56) References Cited

U.S. PATENT DOCUMENTS

| | | | |
|---|---|---|---|
| 7,672,055 B2* | 3/2010 | Amitai | G02B 6/0056 359/485.06 |
| 2007/0008624 A1 | 1/2007 | Hirayama | |
| 2008/0151379 A1* | 6/2008 | Amitai | G02B 6/0055 359/630 |
| 2009/0279180 A1* | 11/2009 | Amitai | G02B 13/22 359/633 |
| 2010/0067110 A1* | 3/2010 | Hadad | G02B 6/00 359/485.06 |
| 2013/0314789 A1* | 11/2013 | Saarikko | G02B 27/0081 359/489.07 |
| 2014/0104665 A1* | 4/2014 | Popovich | G02B 27/0176 359/15 |
| 2014/0240829 A1* | 8/2014 | Weber | G02B 5/0841 359/487.04 |
| 2015/0277124 A1 | 10/2015 | Ide et al. | |
| 2015/0279114 A1 | 10/2015 | Yonekubo | |
| 2016/0124232 A1 | 5/2016 | Ide et al. | |
| 2016/0306170 A1* | 10/2016 | Sarayeddine | G02B 5/30 |

* cited by examiner

OPTICAL DEVICE AND DISPLAY APPARATUS

BACKGROUND

1. Technical Field

The present invention relates to an optical device that enlarges a luminous flux diameter in two directions, and a display apparatus that uses the optical device.

2. Related Art

In apparatuses that display images by performing scanning with light for the display of images, it is preferable that images are displayed with an optical device enlarging a luminous flux diameter in two directions, which mutually intersect one another. For example, in a retina scanning type projection type display apparatus, since a luminous flux used for scanning is caused to be incident via a pupil of an eye of a user from each angle direction, if the luminous flux diameter is small, it is not possible to cause a luminous flux used for scanning to be incident to a pupil of an eye of a user in a case where the positions of the eyes are shifted due to the interval between eyes differing for each user, or the like. Therefore, it is preferable to configure the apparatus so that a luminous flux is incident via a pupil hole of an eye with the luminous flux diameter enlarged even if the positions of the eyes are shifted.

Meanwhile, an element in which a light-transmissive layer and a partially reflective layer are alternately laminated has been suggested as an optical device, and according to such an element, it is possible to enlarge a luminous flux diameter of incident light in a direction in which the light-transmissive layer and the partially reflective layer are laminated (refer to JP-A-2006-301234). Furthermore, if optical devices as disclosed in JP-A-2006-301234, which are different in a direction in which the light-transmissive layer and the partially reflective layer are laminated, are disposed in series, enlargement of a luminous flux diameter in two directions intersecting each other can be achieved.

However, in a case in which two of the optical devices that are disclosed in JP-A-2006-301234 are disposed in series with different lamination directions of the light-transmissive layer and the partially reflective layer, there is a problem in that unevenness in optical intensity distribution and the like occurs if the partially reflective layer is configured from a dielectric multilayered film. That is, in a case in which a dielectric multilayered film that is used in a partially reflective layer is designed for S polarized light, since S polarized light that is emitted from an optical device in a previous stage becomes P polarized light with respect to an optical device in a latter stage, depending on an incidence angle, the transmittance is reduced greatly as a result of the influence of a Brewster angle, and therefore, unevenness in optical intensity distribution and the like occurs in emitted light. In particular, in a case in which the diameter of a luminous flux is enlarged after the luminous flux is used for scanning by a scanning unit, the abovementioned problem becomes more significant since light from a wide angular range is incident.

SUMMARY

An advantage of some aspects of the invention is to provide an optical device that is capable of enlarging a luminous flux diameter in two directions while suppressing the occurrence of unevenness in optical intensity and the like, and a display apparatus that uses the optical device.

According to an aspect of the invention, there is provided an optical device including a first luminous flux diameter enlargement element that includes a plurality of first light-transmissive layers which is provided with a first surface and a second surface that is disposed so as to be parallel to the first surface, and a first partially reflective layer that includes a dielectric multilayered film, a second luminous flux diameter enlargement element that includes a plurality of second light-transmissive layers which is provided with a first surface and a second surface that is disposed so as to be parallel to the first surface, and a second partially reflective layer that includes a dielectric multilayered film, and a retardation element that is disposed between the first luminous flux diameter enlargement element and the second luminous flux diameter enlargement element, in which the plurality of first light-transmissive layers is laminated along a first direction so that the respective first surfaces thereof are mutually parallel to one another, the first partially reflective layer is disposed between two adjacent first light-transmissive layers among the plurality of first light-transmissive layers, the first partially reflective layer is disposed so as to be parallel to the first surface of one first light-transmissive layer among the plurality of first light-transmissive layers, the plurality of second light-transmissive layers is laminated along a second direction so that the respective first surfaces thereof are mutually parallel to one another, the second partially reflective layer is disposed between two adjacent second light-transmissive layers among the plurality of second light-transmissive layers, the second partially reflective layer is disposed so as to be parallel to the first surface of one second light-transmissive layer among the plurality of second light-transmissive layers, and the first direction intersects the second direction.

In this case, light that is incident to the first luminous flux diameter enlargement element repeats transmission and reflection in the first partially reflective layer until being emitted from the first luminous flux diameter enlargement element, and the luminous flux diameter thereof is enlarged in the first direction. In addition, light that is emitted from the first luminous flux diameter enlargement element is incident to the second luminous flux diameter enlargement element and repeats transmission and reflection in the second partially reflective layer until being emitted from the second luminous flux diameter enlargement element, and the luminous flux diameter thereof is enlarged in the second direction. In this instance, a retardation is applied to light that is emitted from the first luminous flux diameter enlargement element by the retardation element, and the light is incident to the second luminous flux diameter enlargement element in a state in which a polarization ratio thereof is changed. Therefore, in comparison with a case in which the retardation element is not provided, it is possible to suppress the occurrence of unevenness in optical intensity distribution and the like even in a case in which the first partially reflective layer and the second partially reflective layer have polarization dependence.

In the optical device, the first luminous flux diameter enlargement element may include a first incidence surface, which is a surface that intersects the first partially reflective layer, and a first emission surface, which is a surface that is opposite to the first incidence surface, the second luminous flux diameter enlargement element may include a second incidence surface, which is a surface that intersects the second partially reflective layer, and a second emission surface, which is a surface that is opposite to the second incidence surface, light that is incident to the first incidence surface may be guided inside the first luminous flux diameter enlargement element and is emitted from the first emission surface, and light that is emitted from the first emission surface may be incident to the second incidence surface via the retardation element and be emitted from the second emission surface.

In the optical device, it is preferable that light that is emitted from the first emission surface includes light along a third direction and light along a fourth direction which is a direction that is different from the third direction, and the first luminous flux diameter enlargement element is disposed so that the first emission surface and the second incidence surface are separated, and is disposed so that light along the third direction, which is emitted from the first emission surface, is incident to the second incidence surface. In this case, since surplus light is not incident to the second incidence surface, it is difficult for unevenness in optical intensity distribution to occur in a luminous flux that is emitted from the second incidence surface.

In the optical device, it is preferable that the first incidence surface and the first emission surface are respectively inclined with respect to the first partially reflective layer, and the amount of light along the third direction is greater than the amount of light along the fourth direction. In this case, since it is possible to reduce the amount of light along the fourth direction, which is not incident to the second incidence surface, it is possible to reduce loss in the amount of light.

In the optical device, it is preferable that a configuration of the dielectric multilayered film of the first partially reflective layer is the same configuration as a configuration of the dielectric multilayered film of the second partially reflective layer. That is, it is preferable that the first partially reflective layer and the second partially reflective layer are formed from dielectric multilayered films which are the same in the film thickness of each layer that configures the dielectric multilayered films, the material, the lamination order and the like. In this case, it is possible to use the same element in the first luminous flux diameter enlargement element and the second luminous flux diameter enlargement element, and therefore, it is possible to achieve a reduction in the cost of the optical device.

In the optical device, in the first partially reflective layer and the second partially reflective layer, a transmittance of a visible range with respect to a first polarized light may be about 50% of a transmittance of a visible range with respect to a second polarized light, of which a polarization direction is orthogonal to that of the first polarized light, and the amount of change in transmittance of a visible range due to change in incidence angle of the first polarized light, is smaller than the amount of change in transmittance of a visible range due to change in incidence angle of the second polarized light. That is, in the optical device according to the invention, since it is possible to suppress the occurrence of unevenness in optical intensity distribution even in a case in which the first partially reflective layer and the second partially reflective layer have polarization dependence, it is possible to provide a first partially reflective layer and a second partially reflective layer with the optimum film configuration with respect to the first polarized light.

In the optical device, it is preferable that the retardation element is a $1/2\lambda$ retardation element.

According to another aspect of the invention, there is provided a display apparatus including a light source section that emits a luminous flux, a scanning unit that performs scanning with the luminous flux that is emitted from the light source section to form an image, a deflection member that deflects light that is used for the scanning by the scanning unit and causes the light to be incident to an eye of a user, and an optical device that is disposed in an optical path from the light source section to the deflection member and enlarges the diameter of a luminous flux, in which the optical device includes a first luminous flux diameter enlargement element that includes a plurality of first light-transmissive layers which is provided with a first surface and a second surface that is disposed so as to be parallel to the first surface, and a first partially reflective layer that includes a dielectric multilayered film, a second luminous flux diameter enlargement element that includes a plurality of second light-transmissive layers which is provided with a first surface and a second surface that is disposed so as to be parallel to the first surface, and a second partially reflective layer that includes a dielectric multilayered film, and a retardation element that is disposed between the first luminous flux diameter enlargement element and the second luminous flux diameter enlargement element, the plurality of first light-transmissive layers is laminated along a first direction so that the respective first surfaces thereof are mutually parallel to one another, the first partially reflective layer is disposed between two adjacent first light-transmissive layers among the plurality of first light-transmissive layers, the first partially reflective layer is disposed so as to be parallel to the first surface of one first light-transmissive layer among the plurality of first light-transmissive layers, the plurality of second light-transmissive layers is laminated along a second direction so that the respective first surfaces thereof are mutually parallel to one another, the second partially reflective layer is disposed between two adjacent second light-transmissive layers among the plurality of second light-transmissive layers, the second partially reflective layer is disposed so as to be parallel to the first surface of one second light-transmissive layer among the plurality of second light-transmissive layers, and the first direction intersects the second direction.

In this case, since the display apparatus includes the deflection member that deflects light that is used for the scanning by the scanning unit, it is possible to use the display apparatus as a retina scanning type projection type display apparatus. Even in this case, since the luminous flux diameter is enlarged in two directions that mutually intersect one another by the optical device and the luminous flux is caused to be incident to an eye of a user, it is possible to cause the luminous flux to be incident via a pupil of an eye even if the positions of the eyes are shifted. In addition, in the optical device, light that is incident to the first luminous flux diameter enlargement element repeats transmission and reflection in the first partially reflective layer being emitted from the first luminous flux diameter enlargement element, and the luminous flux diameter thereof is enlarged in the first direction. In addition, light that is emitted from the first luminous flux diameter enlargement element is incident to the second luminous flux diameter enlargement element and repeats transmission and reflection in the second partially reflective layer until being emitted from the second luminous flux diameter enlargement element, and the luminous flux diameter is enlarged in the second direction. In this instance, a retardation is applied to light that is emitted from the first luminous flux diameter enlargement element by the retardation element, and the light is incident to the second luminous flux diameter enlargement element in a state in which a polarization ratio thereof is changed. Therefore, in comparison with a case in which the retardation element is not provided, it is possible to suppress the occurrence of unevenness in optical intensity distribution and the like even in a case in which the first partially reflective layer and the second partially reflective layer have polarization dependence.

In the display apparatus, it is preferable that the optical device is disposed in an optical path from the scanning unit to the deflection member. In this case, since light with small luminous flux is incident to the scanning unit, it is possible to miniaturize a deflection surface of the scanning unit.

In the display apparatus, it is preferable that the deflection member is provided with a reflective surface that is formed from a concave curved surface. In this case, it is possible to reliably reflect light toward an eye of a user with a simple configuration.

In the display apparatus, it is preferable that the deflection member is a partially transmissive-reflective combiner. In this case, it is possible to configure a see-through type head mounted display (an eye glass display), and therefore, it is possible to simultaneously view external light, which is transmitted through the combiner, and image light, which is incident via a pupil of an eye of a user.

In the display apparatus, the deflection member may be a hologram that deflects incident light using diffraction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
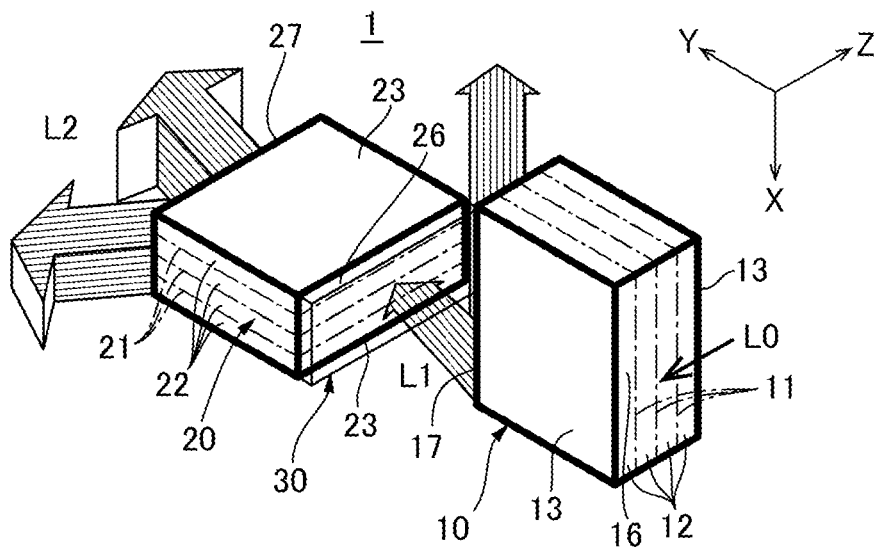
FIGS. 1A to 1C are explanatory diagrams that illustrate an aspect of an optical device according to Embodiment 1 of the invention.

Hereinafter, embodiments of the invention will be described. In addition, in the figures that are referred to in the following description, the numbers and scales of each layer and each member are altered in order to make each layer and each member have a size that is easy to understand in the drawings. For example, the number of partially reflective layers is three in FIGS. 1A to 1C and FIGS. 4A to 4D, the number of the partially reflective layers is two in FIGS. 3A and 3B, and the number of the partially reflective layers is four in FIG. 5.

In addition, in the following description, a "first direction" in the invention is set as a Z direction, a "second direction", which intersects the first direction, is set as an X direction, and a "third direction", which intersects the first direction and the second direction, is set as a Y direction. In addition, in the following description, a case in which the X direction, the Y direction, and the Z direction are mutually orthogonal to one another will be illustrated as an example. In addition, a "third direction" in the invention is set as a Z1 direction, and a "fourth direction" is set as a Z2 direction.

Embodiment 1

Configuration of Optical Device 1

Figure 1B:
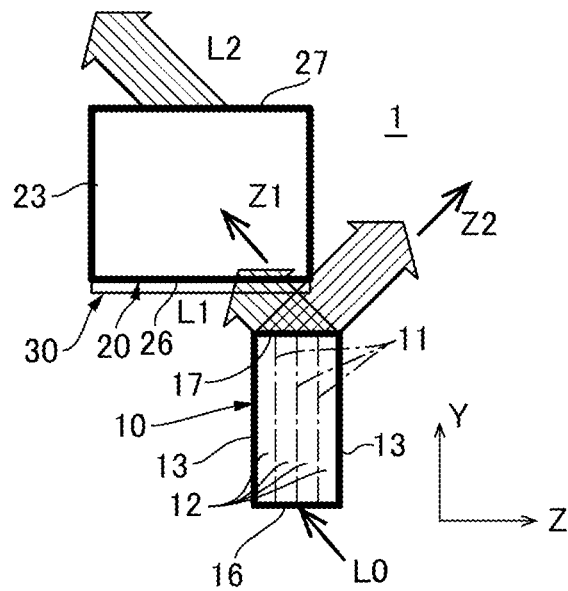
Figure 1C:
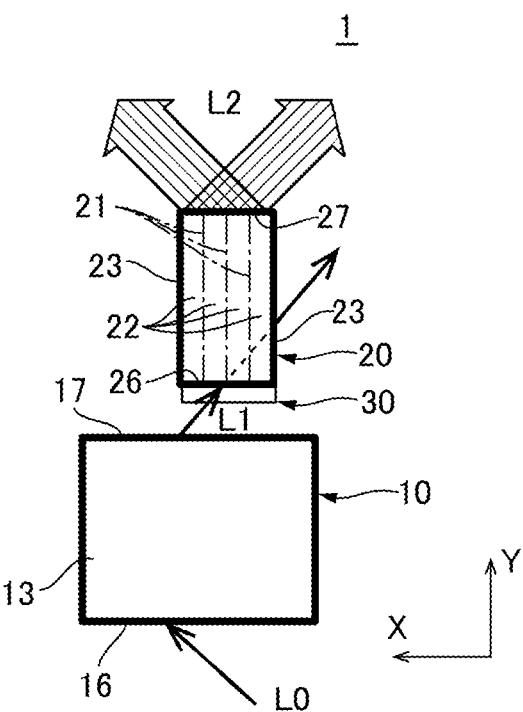

FIGS. 1A to 1C are explanatory diagrams that illustrate an aspect of an optical device 1 according to Embodiment 1 of the invention, and FIGS. 1A to 1C are respectively a perspective view of the optical device 1, an explanatory diagram in which the optical device 1 is viewed from the X direction, and an explanatory diagram in which the optical device 1 is viewed from the Z direction.

As shown in FIGS. 1A to 1C, the optical device 1 of the present embodiment includes a first luminous flux diameter enlargement element 10 in which a first light-transmissive layer 12 and a first partially reflective layer 11 are alternately laminated in the Z direction (the first direction), and a second luminous flux diameter enlargement element 20 in which a second light-transmissive layer 22 and a second partially reflective layer 21 are alternately laminated in the X direction (the second direction). That is, the first luminous flux diameter enlargement element 10 includes a plurality of first light-transmissive layers 12 which are provided with a first surface and a second surface that is disposed so as to be parallel to the first surface, and a plurality of first partially reflective layers 11. The plurality of first light-transmissive layers 12 are laminated along the X direction so that the respective first surfaces thereof are mutually parallel to one another, the first partially reflective layers 11 are disposed between two adjacent first light-transmissive layers 12 among the plurality of first light-transmissive layers 12, and the partially reflective surfaces of the first partially reflective layers 11 are respectively disposed so as to be parallel to the first surface of a single first light-transmissive layer 12 among the plurality of first light-transmissive layers 12. In addition, the second luminous flux diameter enlargement element 20 includes a plurality of second light-transmissive layers 22 which are provided with a first surface and a second surface that is disposed so as to be parallel to the first surface, and a plurality of second partially reflective layers 21. The plurality of second light-transmissive layers 22 are laminated along the X direction so that the respective first surfaces thereof are mutually parallel to one another, the second partially reflective layers 21 are disposed between two adjacent second light-transmissive layers 22 among the plurality of second light-transmissive layers 22, and the partially reflective surfaces of the second partially reflective layers 21 are respectively disposed so as to be parallel to the first surface of a single second light-transmissive layer 22 among the plurality of second light-transmissive layers 22.

The first luminous flux diameter enlargement element 10 includes a first reflective layer 13 (a total reflection layer) on both sides in the Z direction, and the second luminous flux diameter enlargement element 20 includes a second reflective layer 23 (a total reflection layer) on both sides in the X direction. Therefore, it is possible to prevent the leakage of light from the first luminous flux diameter enlargement element 10 and the second luminous flux diameter enlargement element 20. In the first luminous flux diameter enlargement element 10, the first reflective layer 13 and the first partially reflective layers 11 are parallel, and an interval between the first reflective layer 13 and the first partially reflective layer 11, which are adjacent in the Z direction, and intervals between first partially reflective layers 11, which are adjacent in the Z direction, are all equivalent. In the second luminous flux diameter enlargement element 20 also, in the same manner as in the first luminous flux diameter enlargement element 10, the second reflective layer 23 and second partially reflective layers 21 are parallel, and an interval between the second reflective layer 23 and the second partially reflective layer 21, which are adjacent in the X direction, and intervals between second partially reflective layers 21, which are adjacent in the X direction, are all equivalent. In addition, in the first luminous flux diameter enlargement element 10, the thicknesses of the plurality of layers of the first partially reflective layers 11 are all equivalent, and in the second luminous flux diameter enlargement element 20, the thicknesses of the plurality of layers of the second partially reflective layers 21 are all equivalent.

In the present embodiment, the first light-transmissive layers 12 and the second light-transmissive layers 22, for example, include a light-transmissive substrate such as a glass substrate or a quartz substrate, and a light-transmissive adhesive layer, which will be described later, and the first reflective layer 13 and the second reflective layer 23 are formed from vapor deposited films of light-transmissive metal films such as aluminum.

The first partially reflective layers 11 and the second partially reflective layers 21 are formed from a dielectric multilayered film in which, a dielectric film with a low dielectric constant and a dielectric film with a high dielectric constant among inorganic films such as $SiO_2$ (silicon dioxide), $TiO_2$ (titanium dioxide), $Al_2O_3$ (alumina), $CaF_2$ (calcium fluoride), $MgF_2$ (magnesium fluoride), ZnS (zinc sulfide), and $ZrO_2$ (zirconium dioxide), are alternately laminated. In the present embodiment, the first partially reflective layers 11 and the second partially reflective layers 21 are formed from dielectric multilayered films in which $SiO_2$ and $TiO_2$ are alternately laminated using a vapor deposition method.

The first luminous flux diameter enlargement element 10 is provided with a first incidence surface 16, which intersects the first surface of the first partially reflective layers 11, on a first side end section in the Y direction, and is provided with a first emission surface 17, which intersects the first surface of the first partially reflective layers 11, on a second side end section in the Y direction. The second luminous flux diameter enlargement element 20 is provided with a second incidence surface 26 on a first side end section in the Y direction, and is provided with a second emission surface 27 on a second side end section in the Y direction. In this instance, the first emission surface 17 of the first luminous flux diameter enlargement element 10 and the second incidence surface 26 of the second luminous flux diameter enlargement element 20 face one another in a state of being separated in the Y direction. The first luminous flux diameter enlargement element 10 and the second luminous flux diameter enlargement element 20 are disposed so that the first emission surface 17 faces an end section of the second incidence surface 26 in the Z direction, and the second incidence surface 26 faces a substantial center of the first emission surface 17 in the X direction.

In the present embodiment, the first luminous flux diameter enlargement element 10 and the second luminous flux diameter enlargement element 20 have rectangular parallelopiped shapes. Therefore, in the first luminous flux diameter enlargement element 10, the first incidence surface 16 is formed from an end surface toward a first side in the Y direction, and is orthogonal to the first surfaces of the first partially reflective layers 11. In addition, the first emission surface 17 is formed from an end surface toward a second side in the Y direction, and is orthogonal to the first surfaces of the first partially reflective layers 11. In addition, in the second luminous flux diameter enlargement element 20, the second incidence surface 26 is formed from an end surface toward a first side in the Y direction, and is orthogonal to the first surfaces of the second partially reflective layers 21. In addition, the second emission surface 27 is formed from an end surface toward a second side in the Y direction, and is orthogonal to the first surfaces of the second partially reflective layers 21.

In an optical device 1 that is configured in this manner, a luminous flux L0 that is incident to the first incidence surface 16 of the first luminous flux diameter enlargement element 10 from an oblique direction is emitted from the first emission surface 17 after proceeding inside the first luminous flux diameter enlargement element 10. During this period, the luminous flux L0 is emitted from the first emission surface 17 as a luminous flux L1, the luminous flux diameter of which is enlarged in the Z direction, and is incident to the second incidence surface 26 of the second luminous flux diameter enlargement element 20 from an oblique direction. Further, the luminous flux L1 that is incident to the second incidence surface 26 of the second luminous flux diameter enlargement element 20 is emitted from the second emission surface 27 after proceeding inside the second luminous flux diameter enlargement element 20. During this period, the luminous flux L1 is emitted from the second emission surface 27 in an oblique direction as a luminous flux L2, the luminous flux diameter of which is enlarged in the X direction.

In this instance, in the optical device 1, for reasons that will be described later, a retardation element 30 is disposed between the first emission surface 17 of the first luminous flux diameter enlargement element 10 and the second incidence surface 26 of the second luminous flux diameter enlargement element 20. Accordingly, the luminous flux L1 that is emitted from the first emission surface 17 of the first luminous flux diameter enlargement element 10 is incident to the second incidence surface 26 of the second luminous flux diameter enlargement element 20 after the polarization direction thereof is changed as a result a retardation being applied by the retardation element 30. In the present embodiment, the retardation element 30 is a ½λ retardation element (a ½λ wavelength plate). Accordingly, for example, the luminous flux L1 that is emitted from the first emission surface 17 of the first luminous flux diameter enlargement element 10 is incident to the second luminous flux diameter enlargement element 20 after S polarized light is converted into P polarized light in a case of S polarized light, and after P polarized light is converted into S polarized light in a case of P polarized light. In the present embodiment, the retardation element 30 is provided on the second incidence surface 26 of the second luminous flux diameter enlargement element 20. However, as long as the retardation element 30 is between the first emission surface 17 and the second incidence surface 26, the retardation element 30 may, for example, be provided on the first emission surface 17.

Transmission Characteristics of Dielectric Multilayered Film

Figure 2A:
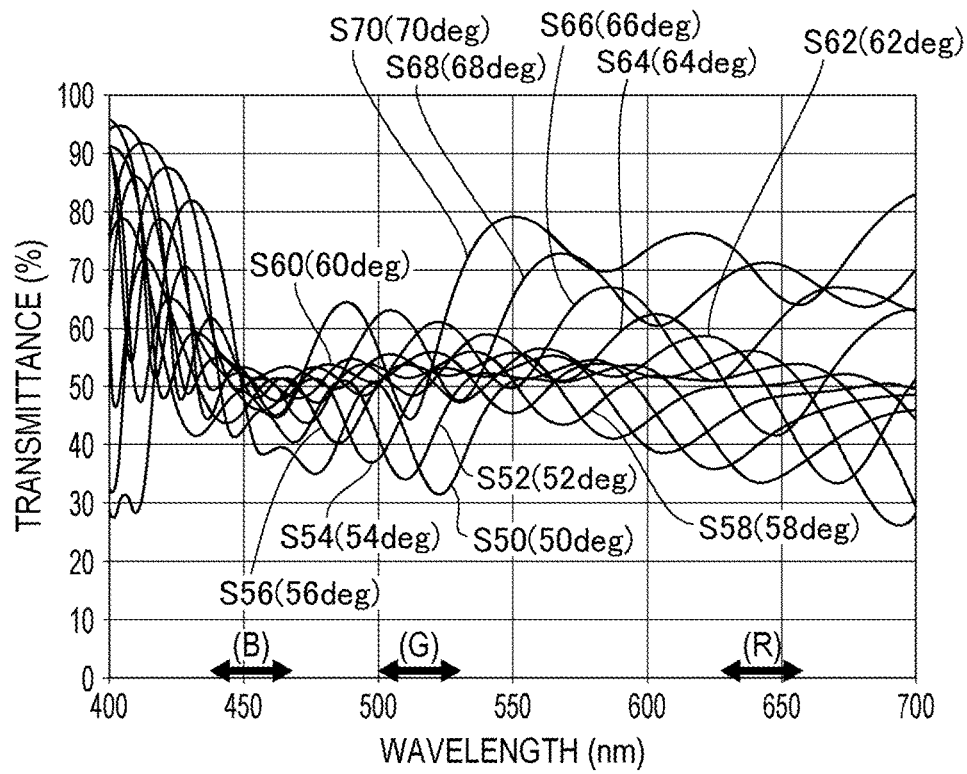
FIGS. 2A and 2B are explanatory diagrams that illustrate an example of transmission characteristics of a dielectric multilayered film that is used in the optical device according to Embodiment 1 of the invention.
Figure 2B:
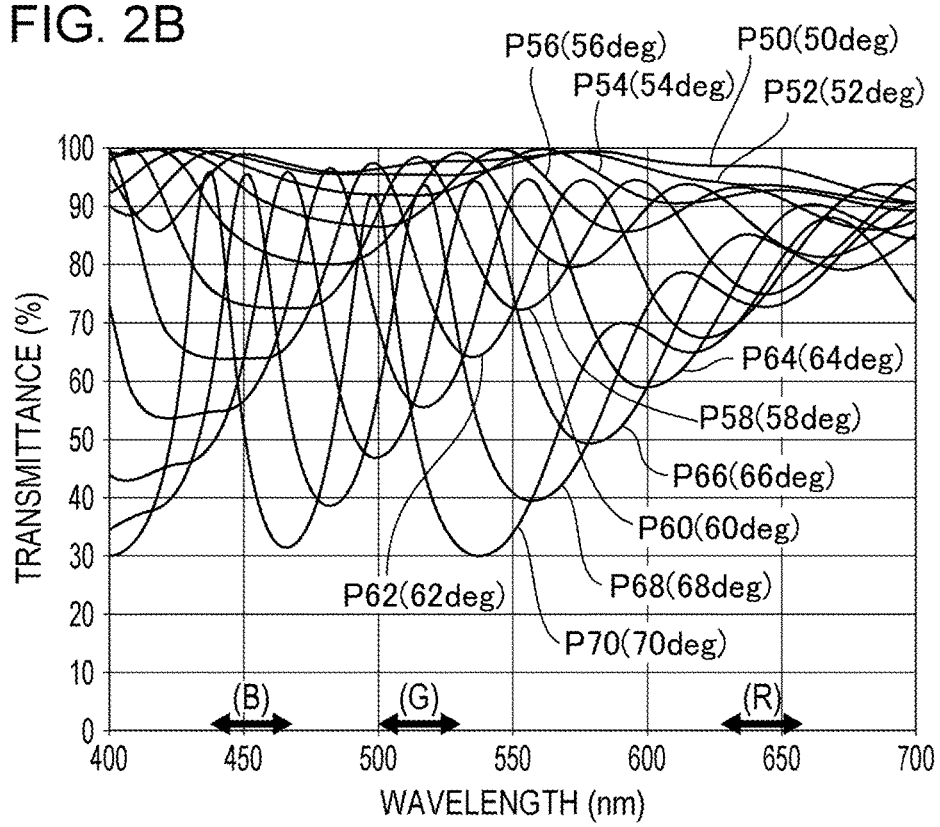

FIGS. 2A and 2B are explanatory diagrams that illustrate an example of transmission characteristics of a dielectric multilayered film that is used in the optical device 1 according to Embodiment 1 of the invention, and FIGS. 2A and 2B are respectively an explanatory diagram that shows transmission characteristics of a dielectric multilayered film with respect to S polarized light, and an explanatory diagram that shows transmission characteristics of a dielectric multilayered film with respect to P polarized light. Additionally, in FIGS. 2A and 2B, transmittance-wavelength characteristics at an incidence angle of 50° to 70° are shown with lines S50 to S70 and P50 to P70.

In the optical device 1 of the present embodiment, the first partially reflective layer 11 and the second partially reflective layer 21 are formed from dielectric multilayered films with the same configuration.

In addition, as shown in FIGS. 2A and 2B, in the dielectric multilayered film that configures the first partially reflective layer 11 and the second partially reflective layer 21, the transmittance of a visible range with respect to S polarized light (a first polarized light) is about 50% of a transmittance of a visible range with respect to P polarized light (a second polarized light), and the amount of change in transmittance due to change in incidence angle of the S polarized light, is smaller than the amount of change in transmittance due to change in incidence angle of the P polarized light. That is, in the present embodiment, the dielectric multilayered film that configures the first partially reflective layer 11 and the second partially reflective layer 21 is set to have a film configuration that is suitable for the S polarized light.

Actions and Effects of Present Embodiment

Figure 3A:
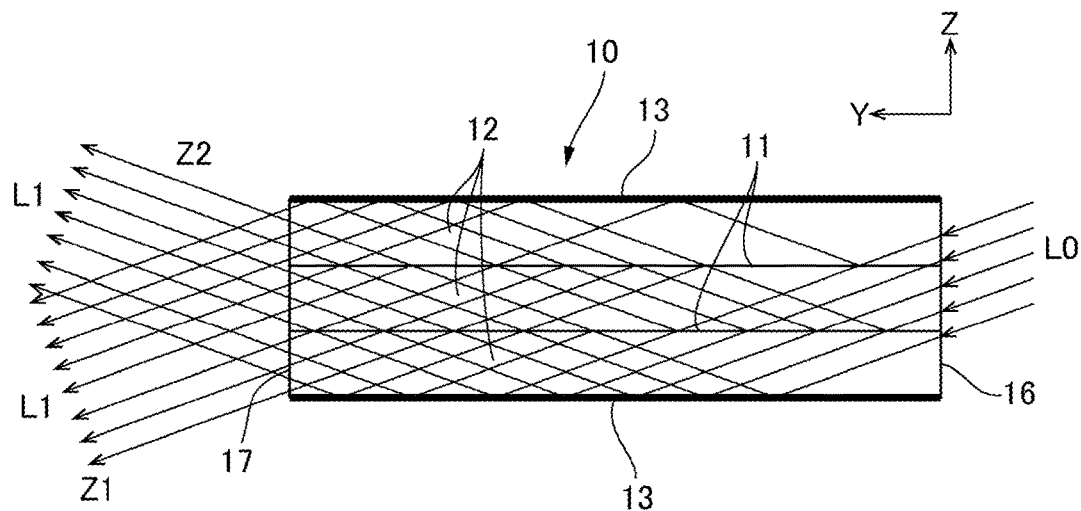
FIGS. 3A and 3B are explanatory diagrams that illustrate a basic principle of the optical device according to Embodiment 1 of the invention.
Figure 3B:
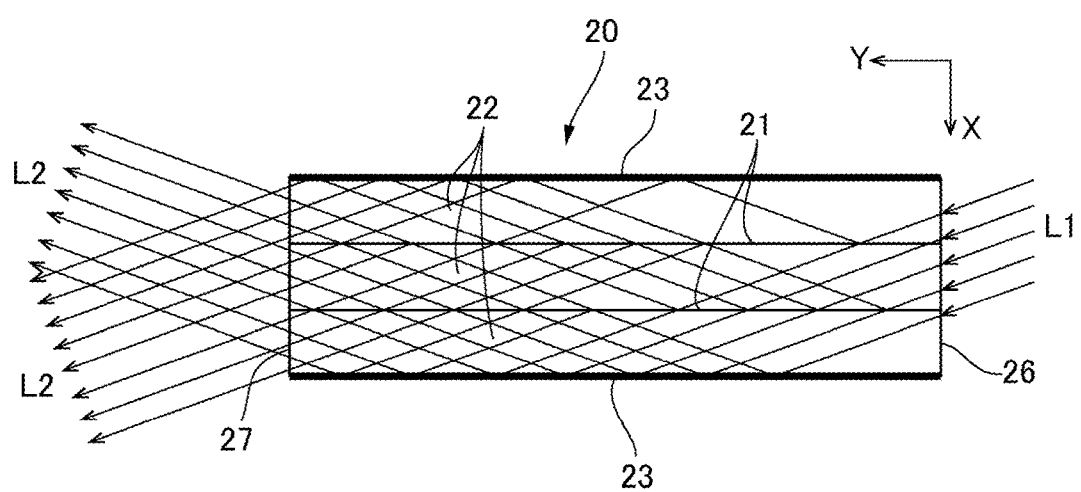

FIGS. 3A and 3B are explanatory diagrams that illustrate a basic principle of the optical device 1 according to Embodiment 1 of the invention, and FIGS. 3A and 3B are respectively an explanatory diagram that schematically shows a circumstance in which light proceeds inside the first luminous flux diameter enlargement element 10, and an explanatory diagram that schematically shows a circumstance in which light proceeds inside the second luminous flux diameter enlargement element 20.

In the optical device 1 of the present embodiment, as shown in FIGS. 1A to 1C and FIG. 3A, in the first luminous flux diameter enlargement element 10, if the luminous flux L0 that proceeds in the Y direction is incident to the first incidence surface 16 from a direction that is inclined in the Z direction as a parallel luminous flux, the luminous flux L0 proceeds in the Y direction while repeating total reflection by the first reflective layer 13, transmission through the first partially reflective layer 11, and reflection by the first partially reflective layer 11, and is emitted as a parallel luminous flux from the first emission surface 17 in a state in which the luminous flux diameter thereof in the Z direction is enlarged. At this time, a luminous flux L1 that is emitted from the first emission surface 17 is emitted in the Z1 direction (the third direction) and the Z2 direction (the fourth direction) being split into two. Additionally, the luminous flux L0 that is incident to the first luminous flux diameter enlargement element 10 is inclined by approximately 45° with respect to the Y direction and the X direction.

In this instance, the first emission surface 17 of the first luminous flux diameter enlargement element 10 and the second incidence surface 26 of the second luminous flux diameter enlargement element 20 are separated. Therefore, among the luminous flux L1 that is emitted from the first emission surface 17 of the first luminous flux diameter enlargement element 10 split into two in the Z direction, only light that is emitted in the Z1 direction is incident to the second incidence surface 26 of the second luminous flux diameter enlargement element 20. Accordingly, the luminous flux L1 that is incident to the second luminous flux diameter enlargement element 20 is inclined with respect to the Z direction and the direction, and is inclined by approximately 45° with respect to the Y direction.

Next, as shown in FIGS. 1A to 1C and FIG. 3B, in the second luminous flux diameter enlargement element 20, if the luminous flux L1, which process in the Y direction, is incident to the second incidence surface 26 from a direction that is inclined in the X direction as a parallel luminous flux, the luminous flux L1 proceeds in the Y direction while repeating total reflection by the second reflective layer 23, transmission through the second partially reflective layer 21, and reflection by the second partially reflective layer 21, and is emitted as a parallel luminous flux from the second emission surface 27 in a state in which the luminous flux diameter thereof in the X direction is enlarged. At this time, a luminous flux L2 that is emitted from the second emission surface 27 is emitted in a state of being split into two in the X direction. At this time, the luminous flux L2 is inclined with respect to the Z direction and the X direction, and is inclined by approximately 45° with respect to the Y direction.

In this instance, the first light-transmissive layer 12 and the first partially reflective layer 11 are alternately laminated in the Z direction in the first luminous flux diameter enlargement element 10, and the second light-transmissive layer 22 and the second partially reflective layer 21 are alternately laminated in the X direction, which intersects the Z direction, in the second luminous flux diameter enlargement element 20. Accordingly, in a case in which the retardation element 30 that is shown in FIGS. 1A to 1C is not provided, polarized light that behaves as S polarized light in the first luminous flux diameter enlargement element 10 behaves as P polarized light in the second luminous flux diameter enlargement element 20, and polarized light that behaves as P polarized light in the first luminous flux diameter enlargement element 10 behaves as S polarized light in the second luminous flux diameter enlargement element 20.

In the present embodiment, in the first partially reflective layer 11 and the second partially reflective layer 21, the transmittance of a visible range with respect to S polarized light (a first polarized light) is about 50% of a transmittance of a visible range with respect to P polarized light (a second polarized light), and the amount of change in transmittance due to change in incidence angle of the S polarized light, is smaller than the amount of change in transmittance due to change in incidence angle of the P polarized light. Accordingly, in a case in which the retardation element 30 is not provided, in the luminous flux L1 that is emitted from the first emission surface 17 of the first luminous flux diameter enlargement element 10, the S polarized light stably has a large optical intensity regardless of an incidence angle thereof, but the S polarized light behaves as P polarized light when proceeding inside the second luminous flux diameter enlargement element 20, and therefore, the optical intensity thereof decreases significantly depending on the incidence angle.

However, in the present embodiment, the retardation element 30 is disposed between the first emission surface 17 of the first luminous flux diameter enlargement element 10 and the second incidence surface 26 of the second luminous flux diameter enlargement element 20. Accordingly, since the S polarized light of the luminous flux L1 that is emitted from the first emission surface 17 of the first luminous flux diameter enlargement element 10 is incident to the second luminous flux diameter enlargement element 20 after being converted into P polarized light by the retardation element 30, optical components that behave as S polarized light in the first luminous flux diameter enlargement element 10 behave as S polarized light also in the second luminous flux diameter enlargement element 20. For this reason, in a case in which the retardation element 30 is provided, the luminous flux L2 that is emitted from the second emission surface 27 of the second luminous flux diameter enlargement element 20 stably has a large optical intensity regardless of an incidence angle thereof, and therefore, unevenness in optical intensity distribution is small.

In addition, in the present embodiment, since the first emission surface 17 of the first luminous flux diameter enlargement element 10 and the second incidence surface 26 of the second luminous flux diameter enlargement element 20 are separated, among light that is emitted from the first emission surface 17 being split into two in the Z direction, only light that is emitted in one direction (the third direction) is incident to the second incidence surface 26. Therefore, surplus light is not incident to the second incidence surface 26. In addition, since the first emission surface 17 of the first luminous flux diameter enlargement element 10 and the second incidence surface 26 of the second luminous flux diameter enlargement element 20 are separated, it is possible to provide a reflective surface, which reflects surplus light of the light that is emitted from the first emission surface 17 toward the first emission surface 17, with respect to the first emission surface 17 of the first luminous flux diameter enlargement element 10, and according to such a configuration, it is possible to return surplus light to the first luminous flux diameter enlargement element 10. For this reason, it is possible to prevent surplus light from being emitted toward the second luminous flux diameter enlargement element 20.

Specific Configuration Example of Optical Device 1

Figure 4B:
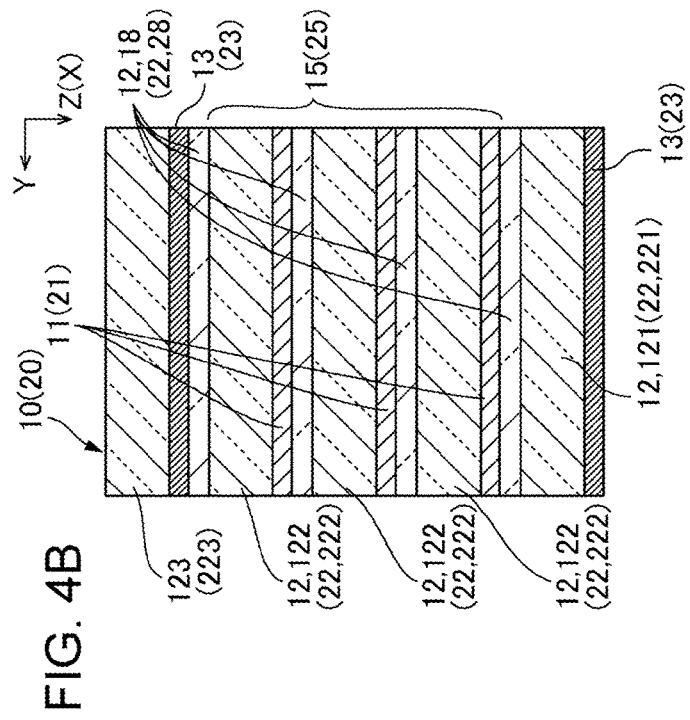
FIGS. 4A to 4D are explanatory diagrams that illustrate an aspect of a specific configuration example of the optical device according to Embodiment 1 of the invention.
Figure 4D:
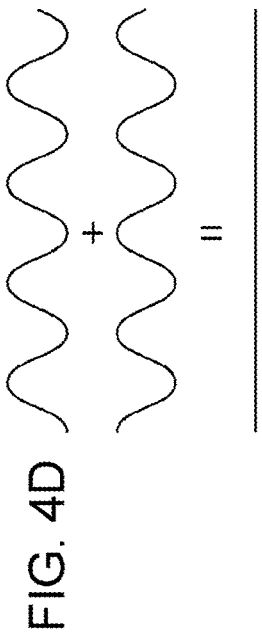
Figure 4A:
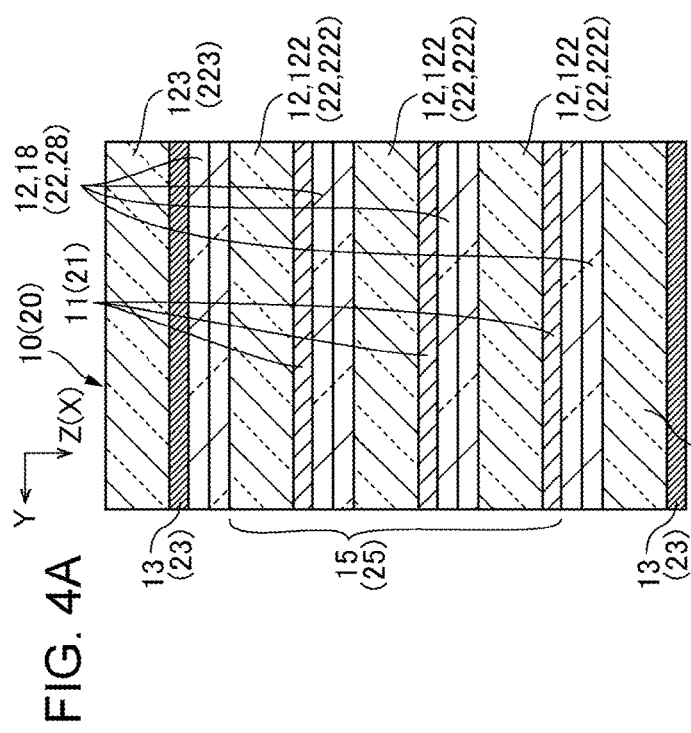

FIGS. 4A to 4D are explanatory diagrams that illustrate an aspect of a specific configuration example of the optical device 1 according to Embodiment 1 of the invention, and FIGS. 4A to 4D are respectively a cross-sectional view that shows a first example of a specific configuration example of the first luminous flux diameter enlargement element 10, a cross-sectional view that shows a second example of a specific configuration example of the first luminous flux diameter enlargement element 10, an explanatory diagram that shows advantages of a case in which the structure that is shown in FIG. 4A is adopted, and an explanatory diagram that shows disadvantages of a case in which the structure that is shown in FIG. 4A is not adopted. Additionally, in the optical device 1 of the present embodiment, since the first luminous flux diameter enlargement element 10 and the second luminous flux diameter enlargement element 20 have the same configuration, in the following description, description will be given focusing on the first luminous flux diameter enlargement element 10, and symbols for components in the second luminous flux diameter enlargement element 20 that correspond to those in the first luminous flux diameter enlargement element 10 are shown in brackets, in FIGS. 4A and 4B.

In the optical device 1 of the present embodiment, as shown in FIG. 4A, in the first luminous flux diameter enlargement element 10, a plurality of light-transmissive layers 12 are respectively configured by light-transmissive substrates (a first substrate 121 and a second substrate 122) with equivalent thicknesses, and light-transmissive first adhesive layers 18, which will be described later. The first luminous flux diameter enlargement element 10 includes a laminated body 15 in which a plurality of light-transmissive second substrates 122, having first surfaces in the Z direction on which the first partially reflective layers 11 are formed, are bonded together by the light-transmissive first adhesive layers 18 with the first surfaces facing the same direction. In addition, a light-transmissive first substrate 121, having a first surface in the Z direction on which the first reflective layer 13 is formed, is bonded to a first side of the laminated body 15 in the Z direction using the first adhesive layer 18, and a third substrate 123, having a first surface in the Z direction on which the first reflective layer 13 is formed, is bonded to a second side of the laminated body 15 in the Z direction using the first adhesive layer 18. In the present embodiment, the third substrate 123 is also formed from a light-transmissive substrate. In this instance, the first substrate 121, the second substrates 122, and the third substrate 123 are formed from a glass substrate, a quartz substrate or the like, and the refractive indexes and thicknesses thereof are equivalent. In addition, all of the plurality of first adhesive layers 18 are adhesives such as silicon-based adhesives, and the refractive indexes thereof after curing are equivalent to the refractive indexes of the first substrate 121, the second substrates 122, and the third substrate 123. In addition, the thickness of one layer of all of the plurality of first adhesive layers 18 is equivalent. Accordingly, an interval between the first reflective layer 13 and the first partially reflective layer 11, which are adjacent in the Z direction, and the intervals between first partially reflective layers 11, which are adjacent in a lamination direction S, are equivalent.

In a manufacturing method such a first luminous flux diameter enlargement element 10, the first substrate 121, the second substrate 122, and the third substrate 123 are bonded together with the first surfaces facing the same direction using the first adhesive layers 18. Firstly, the first reflective layer 13 is formed on the first surface in a first direction S of a first first substrate 121 in the Z direction, and the first adhesive layer 18 is formed on a second surface. Next, the first partially reflective layers 11 and the first adhesive layers 18 are formed in order on the first surfaces in the Z direction of second, third and fourth second substrates 122, and the first adhesive layers 18 are formed on second surfaces. Subsequently, the first reflective layer 13 and the first adhesive layer 18 are formed in order on a first surface in the Z direction of a fifth third substrate 123 and the first adhesive layer 18 is not formed on the second surface. Accordingly, if the five substrates (the first substrate 121, the second substrates 122, and the third substrate 123) are bonded together using the first adhesive layers 18 in a state in which the respective first surfaces thereof face the same direction in the Z direction, one light-transmissive substrate and two layers of the first adhesive layer 18 are present between the first reflective layer 13 and the first partially reflective layer 11, which are adjacent in the Z direction, and between first partially reflective layers 11, which are adjacent in the Z direction. Additionally, in the present example, description has been given with the number of lamination layers of the substrates set as five, but, for example, in a practical sense, approximately 10 substrates are laminated.

Figure 4C:
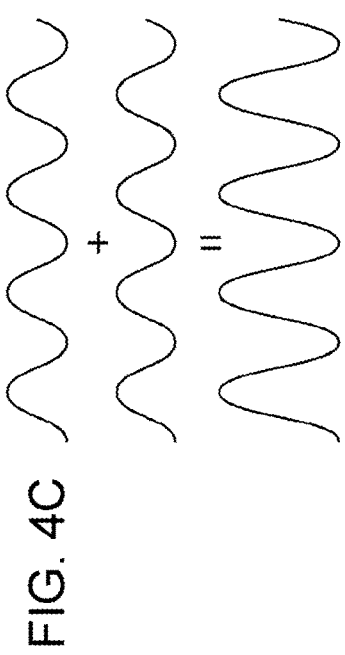

In the first luminous flux diameter enlargement element 10 with such a configuration, an interval between the first reflective layer 13 and the first partially reflective layer 11, which are adjacent in the Z direction, and the intervals between first partially reflective layers 11, which are adjacent in the Z direction, are equivalent. Therefore, the optical path length of light that is emitted from the first emission surface 17 is equivalent regardless of which optical path the light follows when the luminous flux L0 proceeds in the Y direction while repeating total reflection by the first reflective layer 13, transmission through the first partially reflective layer 11, and reflection by the first partially reflective layer 11 inside the first luminous flux diameter enlargement element 10, and is emitted from the second emission surface 27. Accordingly, as shown in FIG. 4C, since peaks and bottoms of phases are aligned in each ray of light that follows each pathway and is emitted from the second emission surface 27, the optical intensity is strengthened. For this reason, optical intensity distribution is substantially constant in light that is emitted from the second emission surface 27 following each pathway. In contrast to this, if the optical characteristics differ between the first reflective layer 13 and the first partially reflective layer 11, which are adjacent in the Z direction, and between first partially reflective layers 11, which are adjacent in the first direction, optical path length differs depending on an optical path when light proceeds in the Y direction while repeating total reflection by the first reflective layer 13, transmission through the first partially reflective layer 11, and reflection by the first partially reflective layer 11 inside the first luminous flux diameter enlargement element 10, and is emitted from the second emission surface 27. Accordingly, as shown in FIG. 4D, as a result of peaks and bottoms of phases being shifted, portions in which the optical intensity is weakened occur, and therefore, decreases in optical intensity and unevenness in optical intensity distribution occur.

In a case in which the first luminous flux diameter enlargement element 10 is, for example, configured in the manner that is shown in FIG. 4B, the thickness of the first light-transmissive layer 12 and the thickness of the first adhesive layer 18 are equivalent between the interval between the first reflective layer 13 and the first partially reflective layer 11, which are adjacent in the Z direction, and the intervals between first partially reflective layers 11, which are adjacent in the first direction. More specifically, the first reflective layer 13 and the first adhesive layer 18 are formed in order on the first surface in the Z direction of the first first substrate 121 among the five light-transmissive substrates, and the first adhesive layer 18 and the like is not formed on the second surface in the Z direction. Next, the first partially reflective layer 11 and the first adhesive layer 18 are formed in order on the first surface in the Z direction of the second, third and fourth second substrates 122, and the first adhesive layer 18 and the like is not formed on the second surface in the Z direction. Subsequently, the first reflective layer 13 is formed on the first surface in the Z direction of the fifth third substrate 123, and the first adhesive layer 18 and the like is not formed on the second surface in the Z direction. In this instance, the thickness of a single first adhesive layer 18 is equivalent over the entire portion. Accordingly, one first light-transmissive layer 12 and one first adhesive layer 18 are present between the first reflective layer 13 and the first partially reflective layer 11, which are adjacent in the first direction, and between first partially reflective layers 11, which are adjacent in the Z direction. Additionally, in this instance, description has been given with the number of the substrates set as five, but, for example, in a practical sense, approximately 10 substrates are laminated.

Additionally, as shown by the symbols in brackets in FIGS. 4A and 4B, the second luminous flux diameter enlargement element 20 has the same configuration as the first luminous flux diameter enlargement element 10, and the second light-transmissive layer 22 is configured by light-transmissive substrates (a first substrate 221 and a second substrate 222) with equivalent thicknesses, and light-transmissive second adhesive layers 28. The second luminous flux diameter enlargement element 20 includes a laminated body 25 in which a plurality of light-transmissive second substrates 222 having first surfaces in a third direction Z on which the second partially reflective layers 21 are formed, are bonded together by the light-transmissive second adhesive layers 28 with the first surfaces facing the same direction. In addition, a light-transmissive first substrate 221 having a first surface in the third direction Z, on which the second reflective layer 23 is formed on is bonded to a first side of the laminated body 25 in the X direction using the second adhesive layer 28, and a third substrate 223 having a first surface in the X direction on which the second reflective layer 23 is formed, is bonded to a second side of the laminated body 25 in the X direction using the second adhesive layer 28. Accordingly, an interval between the second reflective layer 23 and the second partially reflective layer 21, which are adjacent in the X direction, and the intervals between second partially reflective layers 21, which are adjacent in the X direction, are equivalent.

Embodiment 2

Figure 5:
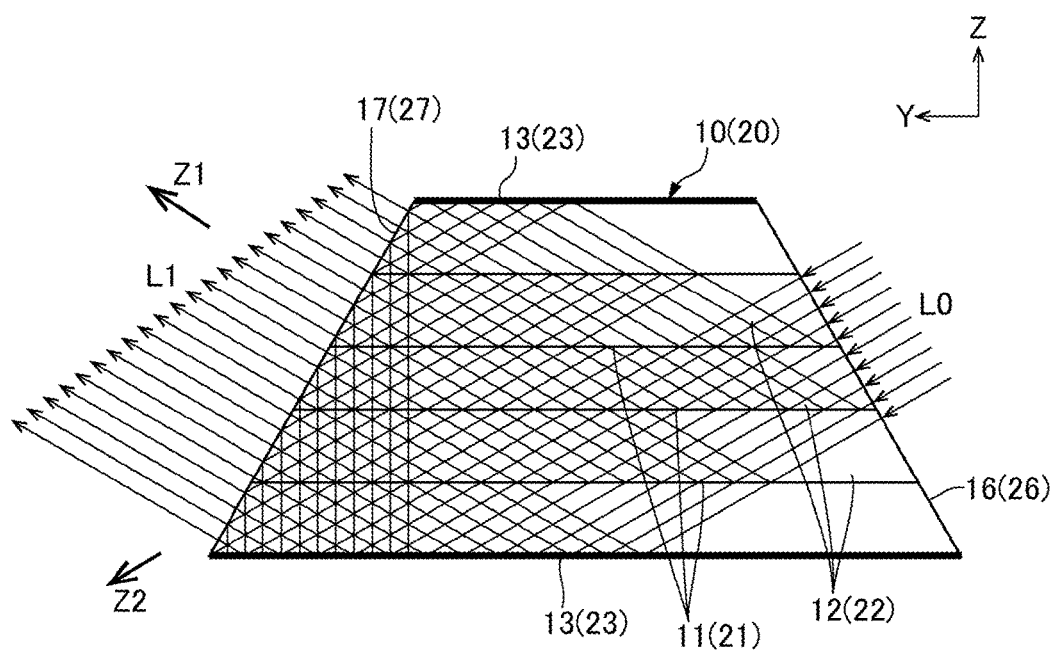
FIG. 5 is an explanatory diagram that illustrates an aspect of an optical device according to Embodiment 2 of an aspect the invention.

FIG. 5 is an explanatory diagram that illustrates an aspect of an optical device 1 according to Embodiment 2 of the invention. In FIG. 5, only the first luminous flux diameter enlargement element 10 is shown. In Embodiment 1, the first luminous flux diameter enlargement element 10 has a rectangular parallelopiped shape, but in the present embodiment, when viewed from the X direction, the first luminous flux diameter enlargement element 10 has a cross-sectional trapezoidal shape in which two sides, which face one another in the Z direction, are parallel, and the first incidence surface 16 and the first emission surface 17 are inclined with respect to the Z direction at the same angle but in directions that are opposite to each other. The first light-transmissive layer 12 and the first partially reflective layer 11, which is formed from a dielectric multilayered film, are also alternately laminated in such a configuration. In addition, the first partially reflective layers 11 are parallel to each other, and intervals between first partially reflective layers 11 that are adjacent in the Z direction are equivalent.

In the first luminous flux diameter enlargement element 10 of such a configuration, since optical path lengths of light are equivalent regardless of which optical path the light follows before being emitted, optical intensity distribution is substantially constant in light that is emitted from the first emission surface 17 following each pathway. In addition, in the first luminous flux diameter enlargement element 10 of the present embodiment, light that is incident to the first emission surface 17 at a shallow angle is reflected by the first emission surface 17. Therefore, among the Z1 direction (the third direction) and the Z2 direction (the fourth direction), the amount of light of light along the Z1 direction, which is incident to the second luminous flux diameter enlargement element 20, is greater than the amount of light along the Z2 direction. For this reason, there is an advantage in that it is possible to reduce loss in the amount of light. The second luminous flux diameter enlargement element 20 has the same configuration as the first luminous flux diameter enlargement element 10. Accordingly, a large amount of light is emitted from the second luminous flux diameter enlargement element 20 in the first direction, the amount of light contributing to image displaying can be increased.

Usage Example of Optical Device in Display Apparatus

Figure 6A:
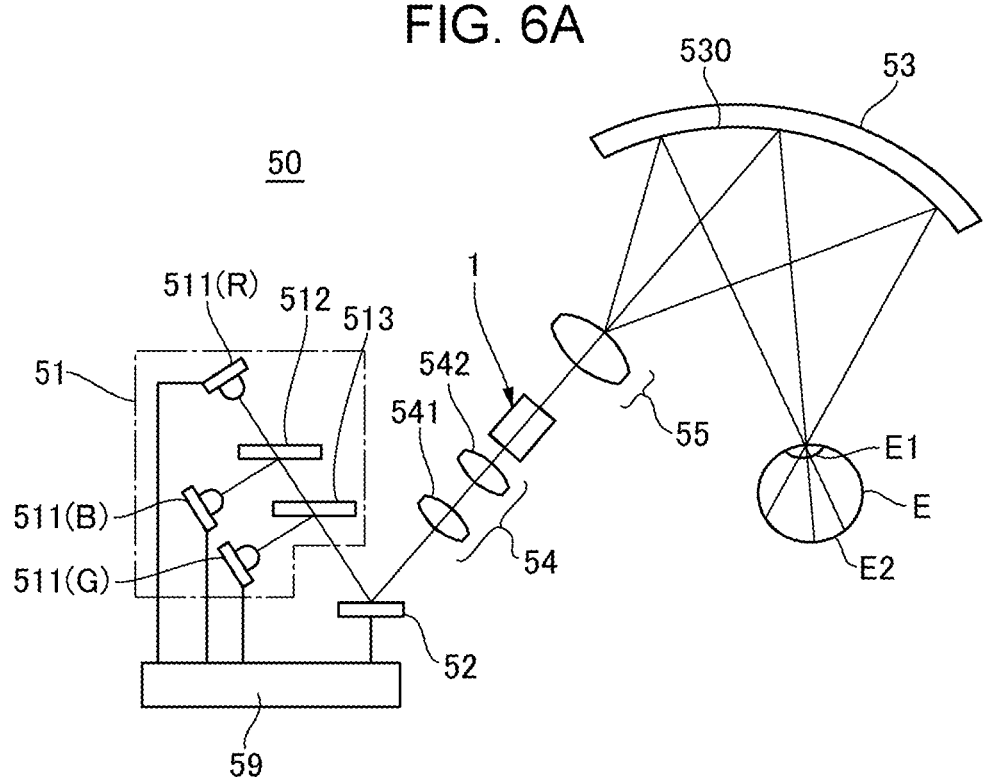
FIGS. 6A and 6B are explanatory diagrams that illustrate an aspect of a display apparatus in which an optical device to which the invention is applied, is used.
Figure 6B:
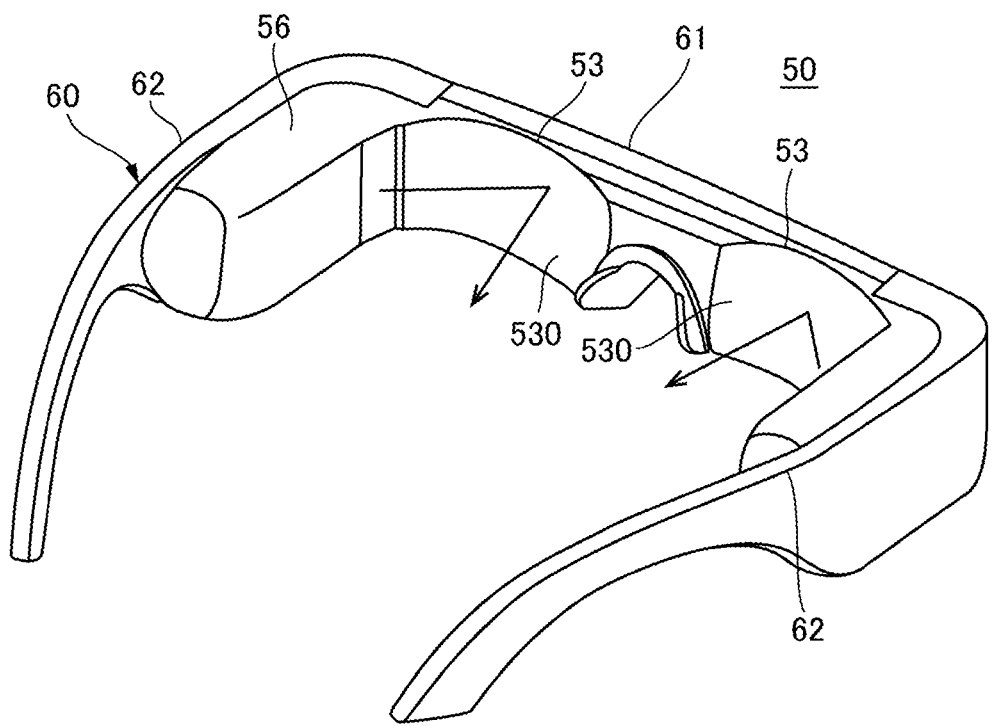

FIGS. 6A and 6B are explanatory diagrams that show an aspect of a display apparatus 50 in which the optical device 1 to which the invention is applied, is used, and FIGS. 6A and 6B are respectively an explanatory diagram of an optical system and an explanatory diagram that shows an external appearance and the like of the display apparatus 50.

In FIG. 6A, the display apparatus 50 includes a light source section 51 that emits light for displaying images, a scanning unit 52 that performs scanning using the light that is emitted from the light source section 51, and a deflection member 53 that deflects light that is used in scanning by the scanning unit 52 and causes the light to be incident to an eye E of a user. In addition, the display apparatus 50 of the present embodiment includes a relay lens system 54 on an emission side from the scanning unit 52, and a projection lens system 55. The relay lens system 54 is, for example, configured by two lenses 541 and 542.

The light source section 51 emits light source light prior to optical modulation or modulated light that has been optically modulated. In the present embodiment, the light source section 51 includes a red laser element 511 (R) that emits red light (R), a green laser element 511 (G) that emits green light (G) and a blue laser element 511 (B) that emits blue light (B), and includes two half mirrors 512 and 513 that synthesize the optical paths of these laser elements. In this instance, the red laser element 511 (R), the green laser element 511 (G) and the blue laser element 511 (B) emit luminous fluxes which are modulated to have the optical intensity that corresponds to each dot of an image to be displayed under the control of a control unit 59.

The scanning unit 52 performs scanning using incident light in two directions that correspond to a horizontal direction and a vertical direction of an image, and light that is used in scanning is projected onto the deflection member 53 via the relay lens system 54 and the projection lens system 55. The scanning unit 52 can, for example, be realized using a micromirror device that is formed by Micro Electro Mechanical Systems (MEMS) technology using a silicon substrate or the like. At this time, the scanning unit 52 may perform scanning using incident light in two directions that correspond to a horizontal direction and a vertical direction of an image using a single scanning mechanism. In addition, the scanning unit 52 may be configured by a first scanning mechanism that performs scanning using incident light in a first direction of two directions that correspond to a horizontal direction and a vertical direction, and a first scanning mechanism that performs scanning using incident light in a second direction of the two directions. Such a scanning unit 52 also performs scanning using incident light in predetermined directions under the control of the control unit 59.

In the present embodiment, the display apparatus 50 is configured as a retina scanning type of projection type display apparatus. In this instance, the deflection member 53 is a reflection member that is provided with a reflective surface 530 that has a concave curved surface shape, reflects projected light and causes the light to be incident to an eye E of a user. In such a display apparatus 50 (a retina scanning type projection type display apparatus), images are recognized by a user as a result of modulated light, which is used in scanning in two directions by the scanning unit 52, being reflected by the reflective surface 530 of the deflection member 53 and arriving at a retina E2 via a pupil E1.

In the present embodiment, the deflection member 53 is a partially transmissive-reflective combiner. Therefore, since external light is also incident to an eye via the deflection member 53 (the combiner), it is possible for a user to recognize an image in which an image that is formed by the display apparatus 50 and external light (scenery) are superimposed. That is, the display apparatus 50 is configured as a see-through type retina scanning type projection apparatus.

In the display apparatus 50 that is configured in this manner, in the present embodiment, the optical device 1 that has been described with reference to FIGS. 1A to 5 is disposed in the optical paths from the light source section 51 to the deflection member 53. Accordingly, as long as the eye E is positioned within a range in which a luminous flux diameter is expanded by the optical device 1, it is possible to for a user to recognize images even if the positions of the eyes are shifted. In addition, in the optical device 1 that is described with reference to FIGS. 1A to 5, even after a luminous flux has been enlarged in two directions, the luminous flux stably has a large light intensity regardless of an incidence angle and unevenness in optical intensity distribution is small. For this reason, since it is possible to set a scanning angle of the scanning unit 52 to be wide, it is possible to provide a user with an image with a large image angle.

In this instance, the optical device 1 may be disposed in any position of between the light source section 51 and the scanning unit 52, between the scanning unit 52 and the relay lens 541, between the relay lenses 541 and 542, and between the relay lens 542 and the projection lens system 55, but disposed between the relay lens 542 and the projection lens system 55 in the present embodiment.

In a case in which a display apparatus 50, which is configured in this manner, is configured as a see-through type head mounted display (an eyeglass display), as shown in FIG. 6B, the display apparatus 50 is formed in a glasses like shape. In addition, in a case of respectively causing modulated light to be incident to left and right eyes E of an observer, the display apparatus 50 includes a left eye deflection member 53 and a frame 60 that supports the left eye deflection member 53 with a front portion 61, and an optical unit 56 that includes an optical component that has been described with reference to FIG. 6A is provided at each of a left and right temples 62 of the frame 60. In this instance, the optical unit 56 may be provided with the light source section 51, the scanning unit 52, the relay lens system 54 and the projection lens system 55, or the optical unit 56 may be provided with only the relay lens system 54 and the projection lens system 55 so that the optical unit 56 and the light source section 51 are connected by an optical cable or the like.

Another Display Apparatus

In the abovementioned embodiment, light after modulation that is emitted from the light source section 51 is used in scanning by the scanning unit 52. However, a configuration in which a liquid crystal panel is irradiated with light while performing scanning using light prior to modulation that is emitted from the light source section 51 using the scanning unit 52, and modulated light that is emitted from the liquid crystal panel is reflected by the deflection member 53, may be adopted.

In addition, in the abovementioned embodiments, a display apparatus 50 that is provided with a relay lens system 54 is illustrated as an example, but the invention may be applied to a display apparatus 50 that is not provided with a relay lens system 54.

In addition, in the abovementioned embodiments, an optical device 1 to which the invention has been applied, has been used in a retina scanning type projection type display apparatus, but the optical device 1 may be used in a projection type display apparatus that makes a virtual image recognizable to a user, or in optical equipment other than a display apparatus.

The entire disclosure of Japanese Patent Application No. 2014-224974, filed Nov. 5, 2014 is expressly incorporated by reference herein.

What is claimed is:
1. An optical device comprising:
a first luminous flux diameter enlargement element that includes a plurality of first light-transmissive layers which is provided with a first surface and a second surface that is disposed so as to be parallel to the first surface, and a first partially reflective layer that includes a dielectric multilayered film;
a second luminous flux diameter enlargement element that includes a plurality of second light-transmissive layers which is provided with a first surface and a second surface that is disposed so as to be parallel to the first surface, and a second partially reflective layer that includes a dielectric multilayered film; and
a retardation element that is disposed between the first luminous flux diameter enlargement element and the second luminous flux diameter enlargement element,
wherein the plurality of first light-transmissive layers is laminated along a first direction so that the respective first surfaces thereof are mutually parallel to one another,
the first partially reflective layer is disposed between two adjacent first light-transmissive layers among the plurality of first light-transmissive layers, the first partially reflective layer is disposed so as to be parallel to the first surface of one first light-transmissive layer among the plurality of first light-transmissive layers,
the plurality of second light-transmissive layers is laminated along a second direction so that the respective first surfaces thereof are mutually parallel to one another,
the second partially reflective layer is disposed between two adjacent second light-transmissive layers among the plurality of second light-transmissive layers, the second partially reflective layer is disposed so as to be parallel to the first surface of one second light-transmissive layer among the plurality of second light-transmissive layers, and
the first direction intersects the second direction.
2. The optical device according to claim 1,
wherein the first luminous flux diameter enlargement element includes a first incidence surface, which is a surface that intersects the first partially reflective layer, and a first emission surface, which is a surface that is opposite to the first incidence surface,
wherein the second luminous flux diameter enlargement element includes a second incidence surface, which is a surface that intersects the second partially reflective layer, and a second emission surface, which is a surface that is opposite to the second incidence surface,
wherein light that is incident to the first incidence surface is guided inside the first luminous flux diameter enlargement element and is emitted from the first emission surface, and
wherein light that is emitted from the first emission surface is incident to the second incidence surface via the retardation element and is emitted from the second emission surface.
3. The optical device according to claim 2,
wherein light that is emitted from the first emission surface includes light along a third direction and light along a fourth direction which is a direction that is different from the third direction, and wherein the first luminous flux diameter enlargement element is disposed so that the first emission surface and the second incidence surface are separated, and is disposed so that light along the third direction, which is emitted from the first emission surface, is incident to the second incidence surface.
4. The optical device according to claim 3,
wherein the first incidence surface and the first emission surface are respectively inclined with respect to the first partially reflective layer, and
wherein the amount of light along the third direction is greater than the amount of light along the fourth direction.
5. The optical device according to claim 1,
wherein a configuration of the dielectric multilayered film of the first partially reflective layer is the same as a configuration of the dielectric multilayered film of the second partially reflective layer.
6. The optical device according to claim 1,
wherein in the first partially reflective layer and the second partially reflective layer, a transmittance of a visible range with respect to a first polarized light is about 50% of a transmittance of a visible range with respect to a second polarized light of which a polarization direction is orthogonal to that of the first polarized light, and the amount of change in transmittance of a visible range due to change in incidence angle of the first polarized light, is smaller than the amount of change in transmittance of a visible range due to change in incidence angle of the second polarized light.
7. The optical device according to claim 1,
wherein the retardation element is a ½λ retardation element.
8. A display apparatus comprising:
a light source section that emits a luminous flux;
a scanning unit that performs scanning with the luminous flux that is emitted from the light source section to form an image;
a deflection member that deflects light that is used for the scanning by the scanning unit and causes the light to be incident to an eye of a user; and
an optical device that is disposed in an optical path from the light source section to the deflection member and enlarges the diameter of a luminous flux,
wherein the optical device includes
a first luminous flux diameter enlargement element that includes a plurality of first light-transmissive layers which is provided with a first surface and a second surface that is disposed so as to be parallel to the first surface, and a first partially reflective layer that includes a dielectric multilayered film,
a second luminous flux diameter enlargement element that includes a plurality of second light-transmissive layers which is provided with a first surface and a second surface that is disposed so as to be parallel to the first surface, and a second partially reflective layer that includes a dielectric multilayered film, and
a retardation element that is disposed between the first luminous flux diameter enlargement element and the second luminous flux diameter enlargement element,
wherein the plurality of first light-transmissive layers is laminated along a first direction so that the respective first surfaces thereof are mutually parallel to one another,
the first partially reflective layer is disposed between two adjacent first light-transmissive layers among the plurality of first light-transmissive layers, the first partially reflective layer is disposed so as to be parallel to the first surface of one first light-transmissive layer among the plurality of first light-transmissive layers, the plurality of second light-transmissive layers is laminated along a second direction so that the respective first surfaces thereof are mutually parallel to one another, the second partially reflective layer is disposed between two adjacent second light-transmissive layers among the plurality of second light-transmissive layers, the second partially reflective layer is disposed so as to be parallel to the first surface of one second light-transmissive layer among the plurality of second light-transmissive layers, and the first direction intersects the second direction.

9. The display apparatus according to claim 8, wherein the optical device is disposed in an optical path from the scanning unit to the deflection member.

10. The display apparatus according to claim 8, wherein the deflection member is provided with a reflective surface that is formed from a concave curved surface.

11. The display apparatus according to claim 8, wherein the deflection member is a partially transmissive-reflective combiner.

12. The display apparatus according to claim 8, wherein the deflection member is a hologram that deflects incident light using diffraction.

\* \* \* \* \*